United States Patent [19]

Kohler

[11] Patent Number: 5,782,605

[45] Date of Patent: Jul. 21, 1998

[54] IMPELLER FOR SEPARATING A CONVEYED STREAM OF MATERIAL

[75] Inventor: Gregory R. Kohler, Williamsport, Pa.

[73] Assignee: Andritz Sprout-Bauer, Inc., Muncy, Pa.

[21] Appl. No.: 684,134

[22] Filed: Jul. 19, 1996

[51] Int. Cl.⁶ .................. F04D 7/04; B02C 18/14; B02C 18/22

[52] U.S. Cl. .................. 415/121.1; 415/143; 415/169.1; 415/199.6; 415/211.1; 415/211.2; 416/175; 416/181; 416/183; 416/203; 416/223 B; 198/569; 241/92; 241/185.6; 414/218

[58] Field of Search .................. 415/121.1, 211.1, 415/211.2, 169.1, 208.1, 223, 143, 199.6; 416/175, 179, 181, 182, 183, 203, 223 R, 223 B, 235; 241/185.6, 92; 198/569; 414/218

[56] References Cited

U.S. PATENT DOCUMENTS

| 591,259 | 10/1897 | Koelner . | |
|---|---|---|---|
| 2,779,455 | 1/1957 | Sinclair . | |
| 2,782,722 | 2/1957 | Chubbuck | 416/181 |
| 2,916,997 | 12/1959 | Terrie . | |
| 2,956,503 | 10/1960 | Neidl . | |
| 3,124,200 | 3/1964 | Wilson | 416/182 |
| 3,136,254 | 6/1964 | Douglas . | |
| 3,441,227 | 4/1969 | Fisher . | |
| 3,467,302 | 9/1969 | Wilson . | |
| 3,640,474 | 2/1972 | Niedl . | |
| 3,746,465 | 7/1973 | Van Doorn et al. | 416/183 |
| 3,773,432 | 11/1973 | Chow et al. . | |
| 3,814,538 | 6/1974 | Sjoqvist | 415/223 |
| 3,851,993 | 12/1974 | Foster . | |
| 3,860,035 | 1/1975 | Semple . | |
| 3,916,542 | 11/1975 | Blanchet . | |
| 3,920,116 | 11/1975 | Butler . | |
| 4,826,402 | 5/1989 | Nachtrieb . | |
| 4,883,406 | 11/1989 | Arnold . | |
| 4,904,159 | 2/1990 | Wickoren | 415/121.1 |
| 5,102,297 | 4/1992 | Thompson . | |
| 5,256,032 | 10/1993 | Dorsch | 415/121.1 |
| 5,379,881 | 1/1995 | Kohler . | |
| 5,573,369 | 11/1996 | Du | 416/223 B |

FOREIGN PATENT DOCUMENTS

0615563 B1  9/1994  European Pat. Off. .

Primary Examiner—Christopher Verdier
Attorney, Agent, or Firm—Alix, Yale & Ristas, LLP

[57] ABSTRACT

An impeller is for separating a conveyed stream of material. The impeller has a central rotatable hub with a plurality of blades extending radially therefrom. The hub and blades form a number of generally wedge-shaped material receiving spaces within the impeller. One set of spaces has a baffle arrangement which is configured to direct material in this set outwardly from the impeller on the upstream side of the baffle arrangement. Another set of spaces has a guide arrangement which is configured to guide the material in this set of spaces outwardly from the impeller on the downstream side of the baffle arrangement. The impeller is particularly useful for separating streams of particulates, such as wood chips, compressed shavings, or the like.

22 Claims, 7 Drawing Sheets

IMPELLER FOR SEPARATING A CONVEYED STREAM OF MATERIAL

BACKGROUND OF THE INVENTION

This invention relates generally to the flow of material, and more particularly to an apparatus for splitting a stream of material into two or more streams.

It is often desirable to split a stream of particulate material into two or more streams each having the same average flow rate. In the mechanical pulping industry, stream splitters are used in order to feed equal amounts of pulp or wood chips into each side of a central rotating disc in one type of refiner.

A typical stream splitter for a stream of particulate material has a Y-type divider blade. When a Y-type stream splitter is used, it is important to feed equal quantities of material in each side of the refiner in order that the refiner operates at its maximum capacity. Furthermore, equal feed in each stream will provide for similar thrust and fiber development on each side of the refiner. However, it often can be both difficult and expensive to achieve an equal split using this type of device, because in order to get equal flow to each side, the incoming stream either must be 100% full, or perfectly centered, with uniform material density and velocity throughout. Otherwise, the more densely packed or faster side of the "Y" receives more material than the other side.

It is known that a material stream can be accurately split by providing equal opposing discharge openings on a simple screw conveyor. However, in order for equal splitting to result, the following three conditions must be met. First, the screw must rotate fast enough for centrifugal force to keep the material on the barrel of the conveyor, in order to distribute it equally to both outlets. Second, the outlets must be exactly 180° apart. Third, any restriction to flow through the outlets must be the same for each outlet. If material encounters more resistance at one outlet or the other, the material will move to the outlet of least resistance, and the split will not be equal.

U.S. Pat. No. 5,379,881, the entire contents of which are incorporated herein by reference, discloses a stream splitting apparatus having a cylindrical housing which contains an impeller. The housing has an axial inlet and two or more outlets which are axially spaced from each other. The apparatus includes an impeller which has a central hub with a plurality of blades extending radially therefrom defining two or more sets of material receiving chambers. Each set of material receiving chambers has guide means directing any material which enters the chambers in that particular set outward through a specific outlet. The device is particularly useful for splitting a stream of particulate material into two separate streams having equal flow rates, even if the flow rate at the inlet to the stream splitter is inconsistent.

SUMMARY OF THE INVENTION

An object of the invention is to provide an improved impeller and method for splitting a stream of material into two streams having equal volume flow rates.

Another object of the invention is to provide an apparatus and method for splitting a single feed stream into multiple streams which have predetermined average flow rate ratios relative to one another.

A further object of the invention is to provide a stream splitting apparatus which is configured to cut and disperse a dense plug of material.

Another object of the invention is to provide a stream splitting apparatus having a compact design.

Another object of the invention is to provide a stream splitter which will operate consistently over a wide range of feed stream flow rates and pressures.

Yet another object of the invention is to provide an apparatus and method for efficiently splitting a stream of particulate material.

A further object of the invention is to provide a stream splitting apparatus which has a relatively simple and sturdy design.

Another object of the invention is to provide a stream splitting apparatus which can be fitted on the drop chute of an existing system.

Other objects will be in part obvious and in part pointed out more in detail hereinafter.

The invention in a preferred form is an impeller for separating a conveyed stream of material. The impeller comprises a central, rotatable hub having a length. A plurality of blades extend radially from the hub at generally the same axial location on the hub. Each blade has a front edge including a portion which is configured to be fluidly connected to an inlet conduit, a back edge, and an outer edge. The blades and hub define a first set of generally wedge-shaped spaces and a second set of generally wedge-shaped spaces within the impeller. Baffle means are formed in or along the first set of generally wedge-shaped spaces. The baffle means have an upstream side and a downstream side. The baffle means are configured to direct material in the first set of generally wedge-shaped spaces outwardly from the impeller on the upstream side of the baffle means. The impeller further includes guide means formed in or along the second set of generally wedge-shaped spaces. The guide means are configured to guide material in the second set of generally wedge-shaped spaces outwardly from the impeller on the downstream side of the baffle means.

In a particularly preferred form of the impeller, the front edge of the blades is a cutting edge for cutting the incoming material.

Preferably, the blades are connected to the hub at an angle relative to the length of the hub in order to provide a particularly effective cutting edge and to promote axial flow. The blades preferably are equally spaced from each other in a manner such that each generally wedge-shaped space in the first set has the same volume. It is further preferred that each generally wedge-shaped space in the second set has the same volume. The impeller preferably is fluidly connected to an outlet conduit for receiving the material which exits from the impeller in two streams. The outlet conduit has divider means for maintaining separation of material which is discharged from the impeller on the upstream and downstream sides of the baffle means.

The invention in another preferred form is an apparatus for separating a conveyed stream of material. The apparatus includes a stationary housing having an annular feed conduit with a central axis and a downstream end, a first wall extending outwardly from a portion of the downstream end, and a second wall connected to the outer perimeter of the first wall and extending in a downstream direction. An impeller is positioned within the housing to form a housing-impeller assembly. The impeller includes a central hub which is coaxial with the feed conduit and has a length, and a plurality of blades extending radially from the hub. Each blade has a front edge, a back edge, and an outer edge. The blades and hub define a first set of generally wedge-shaped spaces and a second set of generally wedge-shaped spaces within the housing-impeller assembly. Baffle means are formed in or along the first set of generally wedge-shaped spaces for guiding conveyed material in the first set of generally wedge-shaped spaces outwardly from the housing-impeller assembly upstream from the baffle through a first housing-impeller assembly outlet which is defined by the annular feed conduit, the baffle means, the blades and the hub. Guide means are formed in or along the second set of generally wedge-shaped spaces for guiding material in the second set of generally wedge-shaped spaces outwardly from the impeller downstream from the baffle means through a second housing-impeller assembly outlet which is defined by the blades, the hub, and the guide means.

In a particularly preferred form of the invention, the baffle means extends between adjacent blades along the back edges of the blades. Preferably, the blades are positioned diagonally relative to the central axis of the housing. This diagonal configuration provides for an inclined cutting edge to more easily penetrate and break up an incoming plug of material. The blade angle also helps to convey the material axially through the impeller.

Another preferred form of the invention is a method of separating a stream of material into at least two streams having a predetermined ratio of volume flow rates. The method comprises feeding the material into an impeller of the type described above.

The invention accordingly comprises the several steps and the relation of one or more of such steps with respect to each of the others and the article possessing the features, properties, and the relation of elements exemplified in the following detailed disclosure.

DETAILED DESCRIPTION OF THE PREFERRED EMBODIMENT

Referring now to the drawings and particularly to FIGS. 1–7, a first embodiment of a stream separating impeller is shown and is designated as 12. The impeller 12 is part of a particle separation apparatus 10. The impeller 12 is fluidly connected on its upstream side 13 to a stationary annular feed conduit 14. The annular feed conduit 14 fluidly connects an upstream screw-type feeder 24 to the impeller 12. The feed conduit 14 is configured to convey a plug of particulate material, such as wood chips, sawdust or the like to the impeller 12.

The impeller 12 breaks up the incoming material into four parts of equal volume and discharges the material in two streams of equal volume in an outlet conduit 83. The particle separation apparatus thus includes the screw-type feeder 24, the feed conduit 14, the impeller 12, and the outlet conduit 83.

The impeller 12 has a rotatable central hub 42 which is coaxial with the annular feed conduit 14. The impeller 12 is driven by the central hub 42, which is driven by conventional drive means 46, shown in FIG. 1. The hub 42 is separate from the hub which drives the screw-type feeder 24. The rotatable central hub 42 of the impeller 12 rotates faster than the hub for the screw-type feeder 24.

The impeller 12 has two opposite radially extending blades 47, and two opposite radially extending blades 48. All of the blades 47, 48 are equally spaced from each other. Each blade 47, 48 preferably is angled at about 45 degrees relative to the direction of the length of the central hub 42 of the impeller 12 in order to provide for efficient cutting and wear resistance, and to promote axial flow. Each blade 47 has an inner portion 50 which is generally rectangular, is connected to the central hub 42, and extends outwardly from the central hub 42. Coplanar to an inner portion 50 is an outer portion 52 which has a bevelled outer edge 54. Each blade 47 has an upstream cutting edge 56, and a downstream edge 58 which is connected to a wedge-shaped disc 82, the function of which is described below. The outer edge 54 is bevelled in a direction such that the cutting edge 56 is shorter than the downstream edge 58.

Each blade 48 has an inner portion 51, which is generally rectangular, is connected to the central hub 42, and extends outwardly from the central hub 42. Coplanar to the inner portion 51 is an outer portion 53 which includes a rectangular extension portion 55. The rectangular extension portion 55 extends in an upstream direction and axially overlaps feed conduit 14 to ensure that material is not lost between the impeller 12 and the feed conduit 14. Each blade 48 has an upstream cutting edge 57, a downstream edge 59 which is connected to a wedge-shaped disc 82, and an outer edge 61.

The central hub 42 and blades 47, 48 together define four generally wedge-shaped spaces, including two opposite generally wedge-shaped spaces 64 in a first set and two opposite generally wedge-shaped spaces 66 in a second set. The shape of the generally wedge-shaped spaces is further described below. When the impeller 12 is configured to rotate in a clockwise direction when viewed from the inlet conduit 14, each of the generally wedge-shaped spaces 64 has a blade 47 on its leading side and a blade 48 on its trailing side. This arrangement provides that material which is contacted by the rectangular extension portions 55 remains in spaces 64 until it is discharged.

Each generally wedge-shaped space 64 is bordered on the downstream side of the impeller 12 by a flat, wedge-shaped disc 82. 10 The wedge-shaped discs 82 serve as a separation baffle for the two outlet streams, and assure that material in a first generally wedge-shaped space 64 exits from the impeller 12 only through a first impeller outlet 74, which is upstream from the discs 82. Outlet 74 is defined by outer edge 54, the portion of outer edge 61 which is downstream from the feed conduit 14, the outer edge of the wedge-shaped disc 82, and the lower portion of the downstream edge of feed conduit 14. The material exits radially in the direction shown by arrow A in FIG. 4 and then falls due to gravity downward from the impeller 12 into a first side 81 of an outlet conduit 83 which has a stationary conduit divider 85. The conduit divider 85 is coplanar with the discs 82 and extends both downward and upward from the impeller 12 through the conduit 83.

Figure 3:
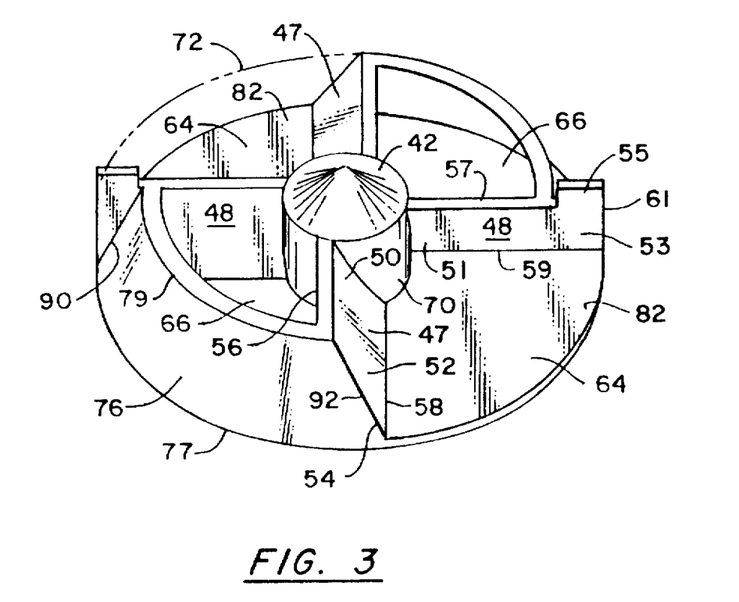
FIG. 3 is a schematic perspective view of the impeller shown in FIG. 1, with the blade support member 49 not shown.
Figures 4, 5:
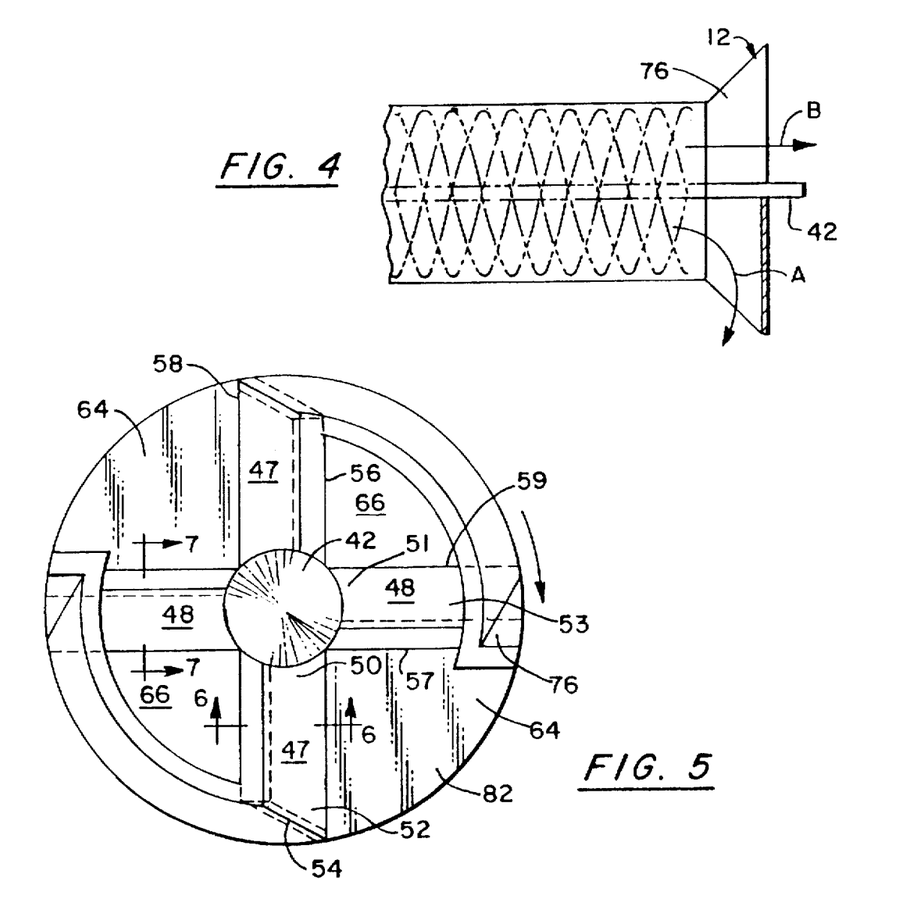
FIG. 4 is a schematic side view of the impeller shown in FIG. 1, showing the flow pattern through the impeller.
FIG. 5 is a view of the impeller taken along line 5—5 of FIG. 1.

Frustoconical guide members 76 are positioned along each of the generally wedge-shaped spaces 66 in the second set. As is shown in FIG. 3, each guide member has a downstream edge 77, and an upstream edge 79 which is shorter than the downstream edge 77. Each guide member 76 is connected at end 92 to the outer edge 54 of an adjacent blade 47 and, at end 90, to a comparable location along the surface of an adjacent blade 48. As shown in FIGS. 3 and 5, the guide members 76 and discs 82, when mounted on the blades, form a circular outer diameter for the impeller 12 when the impeller 12 is viewed from an upstream position. The guide members 76 are conical in a direction such that their concave side is facing the downstream end of the impeller. As shown in FIG. 3, the ends 90, 92 of the guide members 76 are angled at about 25°–60° relative to the axis of the impeller. The guide members 76, combined with the absence of any wedge-shaped discs 82, provide that material in each generally wedge-shaped space 66 exits only through a second impeller outlet 86, which preferably provides for axial discharge of the material. The second impeller outlet 86 from each generally wedge-shaped space 66 is defined by the downstream edge 58 of the blade 47, the downstream edge 59 of the blade 48, the central hub 42, and the downstream edge 77 of the guide member 76. Material which exits from the second impeller outlets 86 follows the flow path shown by arrow B in FIG. 4, and subsequently falls downward due to gravity through a second side 87 of the outlet conduit 83.

Figure 1:
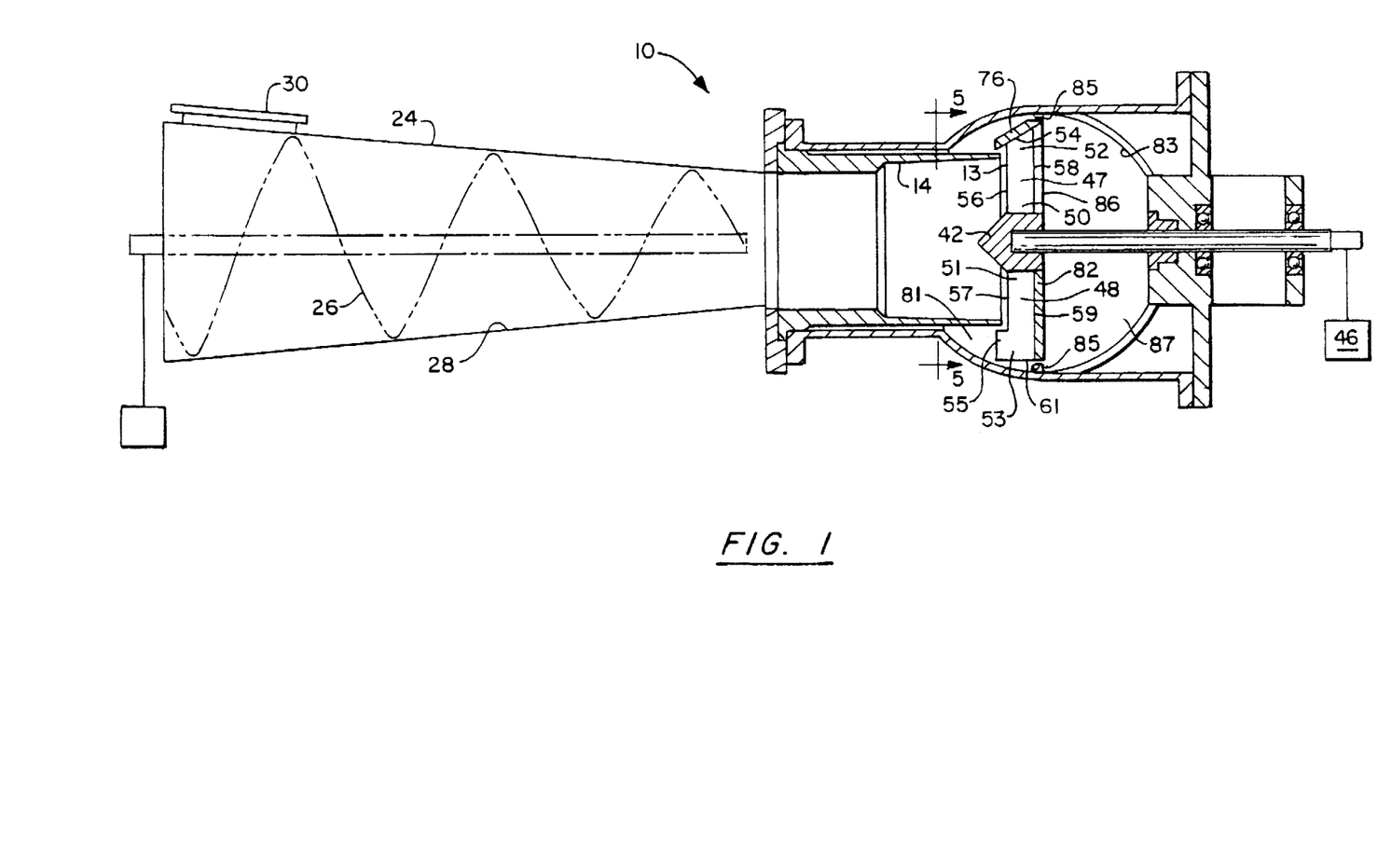
FIG. 1 is a top partial sectional view of an impeller according a first embodiment of the invention, the impeller being fluidly connected to an upstream screw-type feeder and to a downstream outlet conduit which is divided into two halves.
Figure 2:
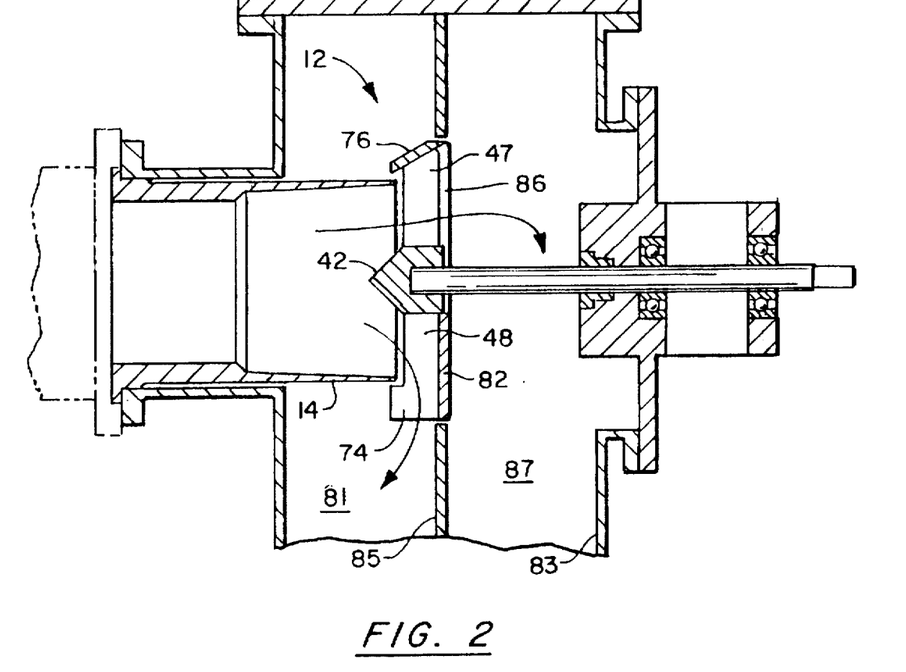
FIG. 2 is a side sectional view of the impeller shown in FIG. 1.

As indicated above, the annular feed conduit 14 is fluidly connected to an upstream screw-type feeder 24 or the like. The screw-type feeder 24 has a flight 26. The downstream end of the flight 26 terminates upstream from the annular feed conduit 14 or, at a minimum, upstream from the impeller 12 in order that the cutting edge 56 of the blades contacts the plug of feed material, thereby breaking the plug of material into smaller pieces. The tapered inner wall 28 of the screw-type feeder 24 has a downstream diameter which is equivalent to or smaller than the diameter of the annular feed conduit 14. The screw-type feeder 24 has a feeder inlet 30 for receiving feed material.

Figure 6:
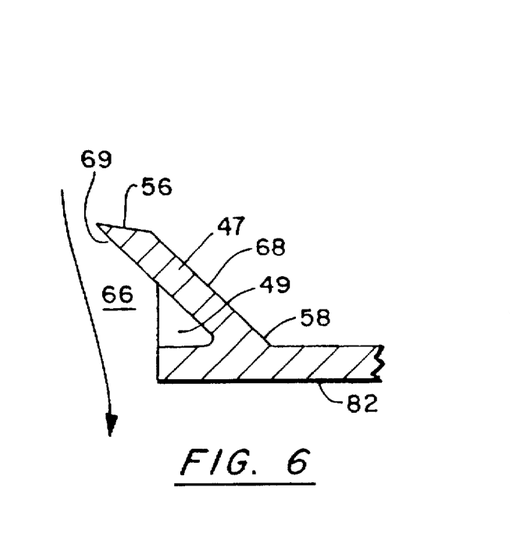
FIG. 6 is a side sectional view of an impeller blade including the blade support member 49 taken along line 6—6 of FIG. 5, and a portion of an adjacent wedge-shaped space which is included in the second set of wedge-shaped spaces.

FIG. 6 shows a side view of a blade 47 and an adjacent generally wedge-shaped space 66. The blade 47 is mounted to one of the discs 82. The blade 47 is supported by blade support member 49, which has a triangular cross section and extends between the upstream end of the blade 47 and the disc 82. Material which enters the generally wedge-shaped space 66 flows outwardly from the impeller 12 in a generally axial direction.

Figure 7:
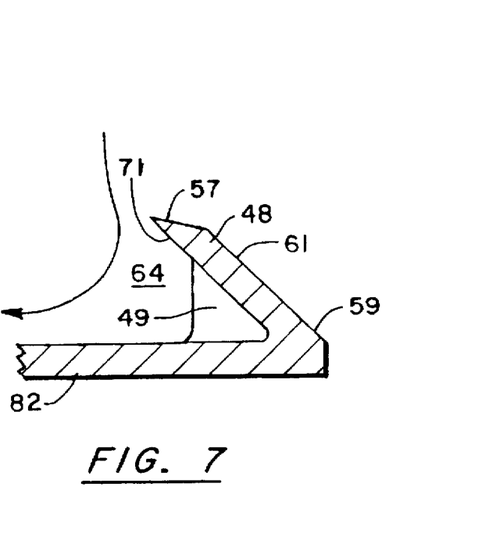
FIG. 7 is a side sectional view of a blade including the blade support member 49 taken along line 7—7 of FIG. 5, and a portion of an adjacent wedge-shaped space which is included in the first set of wedge-shaped spaces.

FIG. 7 shows a side view of a blade 48 and an adjacent generally wedge-shaped space 64. The blade 48 is mounted to one of the discs 82. The blade 48 is supported by a blade support member 49, which has a triangular cross section and extends between the upstream end of the blade 48 and the wedge-shaped disc 82. Material which enters the generally wedge-shaped space 64 flows outwardly from the impeller 12 in a generally radial direction.

As used herein, the term "generally wedge-shaped spaces" 64 and 66 refer to three-dimensional spaces which are defined by (1) a flat, angled surface 68 which is formed by a flat face of a blade 47 which forms an obtuse angle with a wedge-shaped disc 82 or a flat, angled surface 61 which is formed by a flat face of a blade 48 which forms an obtuse angle with a wedge-shaped disc 82, (2) an opposite surface 69 (or 71) which is defined by the face of a blade 47 (or 48) which forms an acute angle with a wedge-shaped disc 82 in combination with the exposed rectangular surface of a blade support member 49, (3) an inner face 70 having the shape of an angled segment from the outside surface of a cylinder, which is defined by the hub 42, and (4) an outer border 72 which is defined by a curve which connects outer edge 54 of blade 47 and the portion of the outer edge 61 of the blade 48 which is downstream from the cutting edges 56 and 57. The outer border 72 is not a physical surface. Furthermore, the plane of discs 82 forms the downstream boundary of each of the generally wedge-shaped spaces 64, and 66.

The particle separating apparatus 10 of the invention operates in the following manner. Particulate material is chopped or ground prior to being fed into the screw-type feeder 24. Material in feeder 24 is pushed to the impeller 12 through the annular feed conduit 14 by the screw-type feeder 24. The four blades 47, 48 of the spinning impeller divide the incoming plug into four equal streams with one quarter of the material entering into each generally wedge-shaped space 64, 66. Thus, half of the material enters the two generally wedge-shaped spaces 64 and the other half enters the two generally wedge-shaped spaces 66. The impeller 12 receives material continually by force feeding or, in the event the impeller is disposed diagonally or horizontally, by force or gravity feeding through the top as discussed further below. Typically, the impeller will rotate at a rate of about 200–600 revolutions per minute (rpm) and will split a stream which has a volume flow rate of about 25–150 cubic feet per minute. The impeller can be sized and operated under conditions sufficient to handle a desired capacity. Sizing will depend in part on whether the apparatus is to be used to process chips, sawdust or fiber. As a result of the rotational speed of the impeller, the material is centrifugally driven to the outer perimeter of the generally wedge-shaped spaces 64 and 66. Material which enters the first set of generally wedge-shaped spaces 64 is carried in a rotational direction until it is below the axis of the annular feed conduit 14, at which time it falls from the apparatus through the first impeller outlet 74. Material is not carried out of the first generally wedge-shaped spaces 64 in an upward direction. If upward movement does occur, the material subsequently falls back into the first generally wedge-shaped spaces 64 due to gravity and then exits through the first impeller outlet 74. Material which enters the second generally wedge-shaped spaces 66 immediately moves axially outward through the second impeller outlet 86 and then falls downward in the outlet conduit 83 due to gravity.

The embodiment of FIGS. 1–7 is particularly advantageous in that it has a single hub and is therefore of a simpler design than the double screw feeders which are often used in conjunction with stream splitters. Another advantage is that it breaks up the plug into uniform small particles. The main advantage as a splitter is that it chops the incoming flow into equal pieces and alternately sends them to two different outlets. If the flow surges or favors one side of the infeeding conduit, the impeller 12 will still split the incoming stream equally.

Figure 8:
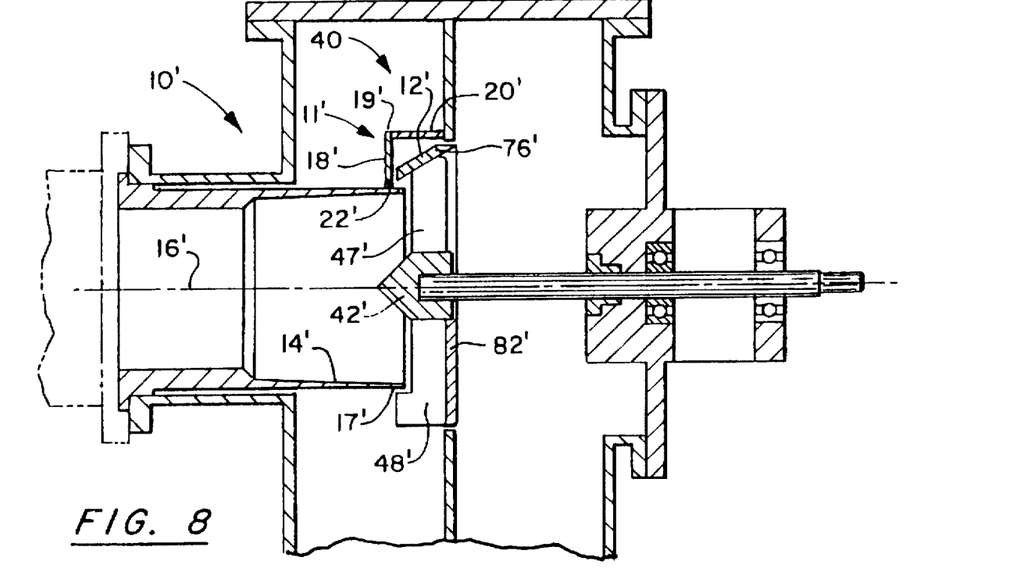
FIG. 8 is a side sectional view of a second embodiment of the invention in which the impeller is partially enclosed in a housing.
Figure 9:
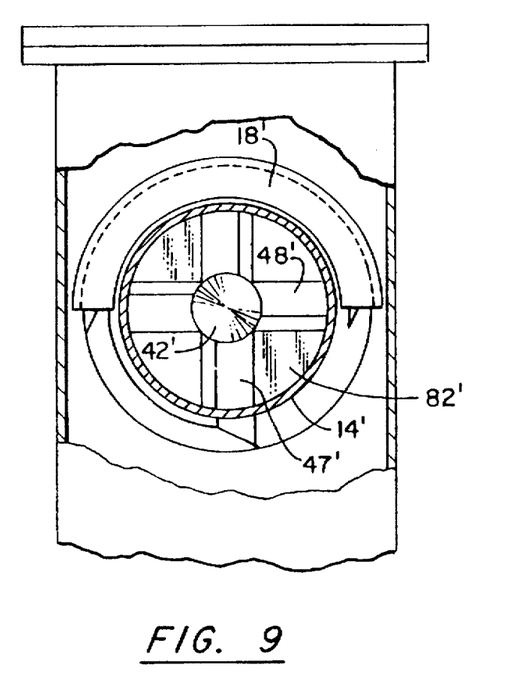
FIG. 9 is a front sectional view of the housing and impeller shown in FIG. 8.

Referring now to FIGS. 8–9, a second embodiment of a particle separating apparatus is shown and designated as 10'. The apparatus includes a rotatable impeller 12' which is mounted in a stationary housing 11' to form a housing-impeller assembly 40. The housing 11' includes an annular feed conduit 14' with an axis 16'. A first wall 18' is connected to the upper half of the downstream end 17' of feed conduit 14' and extends in a direction perpendicular to the axis 16'. The first wall 18' preferably has a hollow, semicircular configuration with an outer edge 19'. A semi-annular second wall 20' is connected to the outer edge 19' of the first wall 18' and extends axially from the first wall 18' in a downstream direction. The first wall 18' defines in its hollow center a central, axial opening 22' which receives the inlet conduit 14'. The impeller 12' has the same general structure as the impeller 12 described above, including a central hub 42', two blades 47', two blades 48', two wedge-shaped discs 82', and two guide members 76'. The advantage of this embodiment of the invention is that the housing 11' prevents material from being trapped above the annular feed conduit 14' on the upstream side of the discs 82'.

Figure 10:
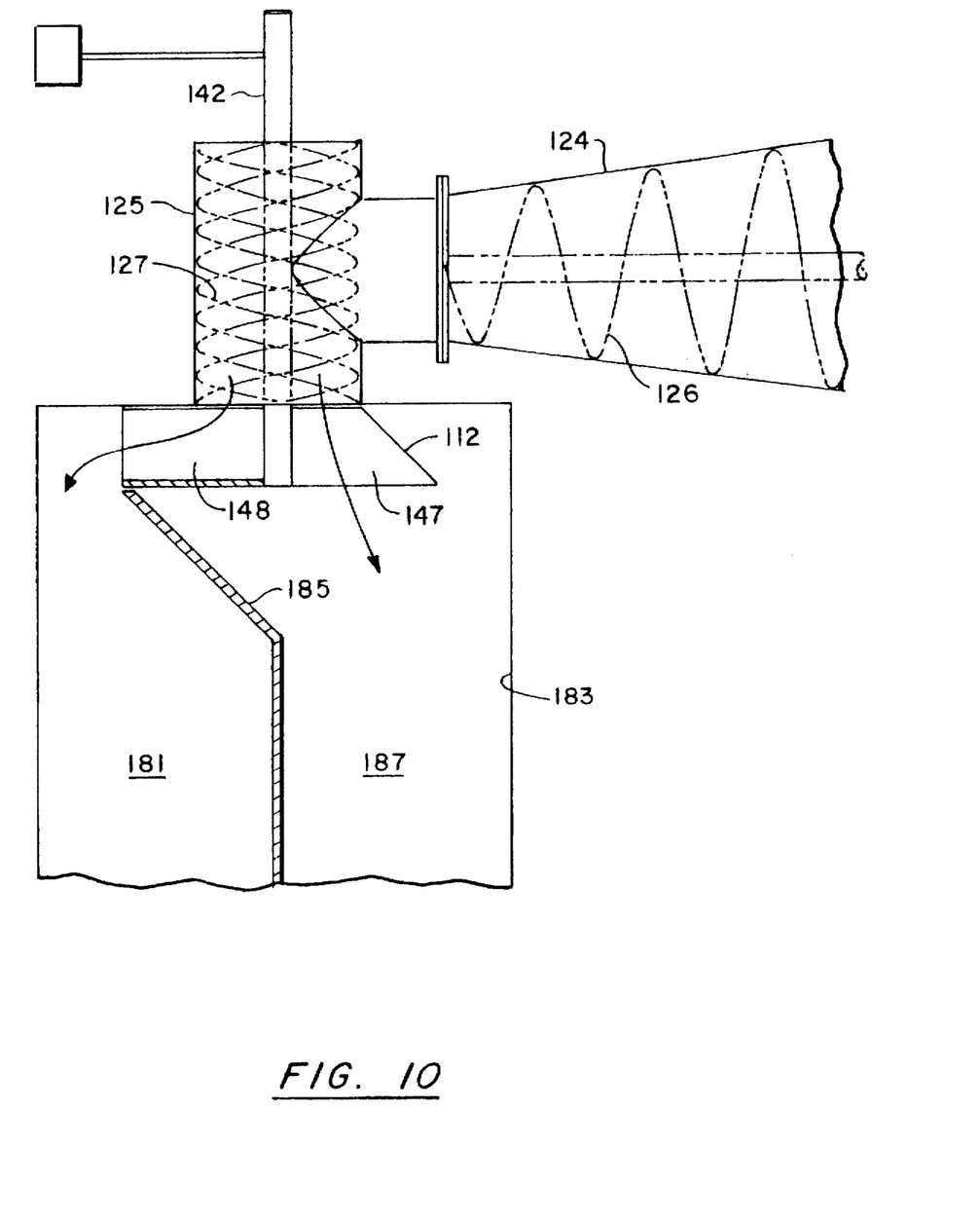
FIG. 10 is a side partial sectional view of an embodiment of the invention which employs a horizontally disposed impeller.

Yet another embodiment of the invention, which is shown in FIG. 10, involves feeding material vertically downward into a horizontally disposed impeller 112. In this embodiment, material from horizontal screw feeder 124 with a single flight 126 is fed into a vertical screw feeder 125 which has four flights 127. The material is cut by the edges of the flights 127. The flights 127 optionally are connected to the front edges of two impeller blades 147 and two blades 148. The cut material is transferred vertically downward into the impeller 112 and is discharged to a first side 181 and a second side 187 of an outlet conduit 183 in equal amounts. In this embodiment, the outlet conduit 183 has a conduit divider 185 which is angled at about 45° directly beneath the impeller 112, and is then vertically arranged further below.

The impeller 112 and the vertical screw feeder 125 are driven by the same hub 142.

Figure 11:
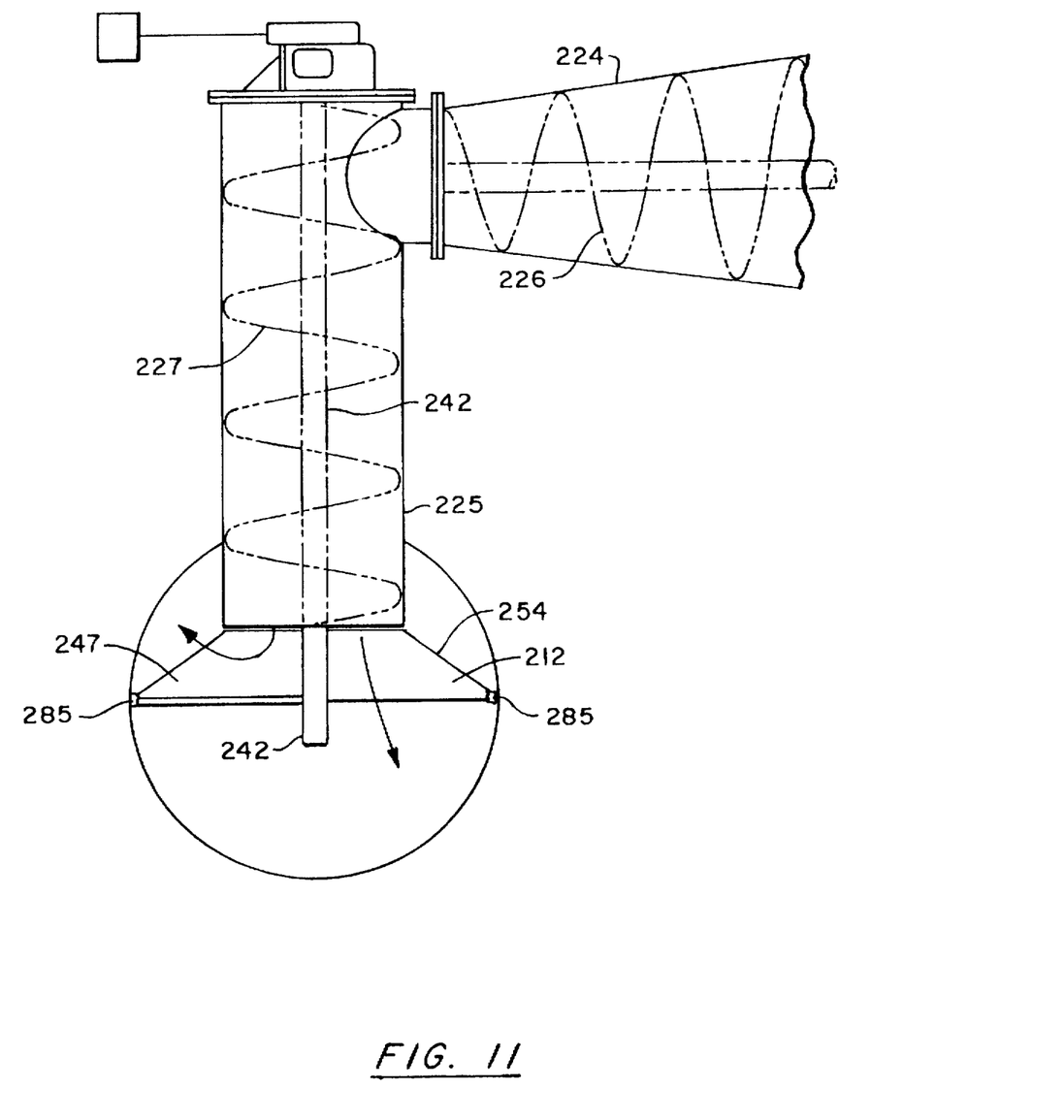
FIG. 11 is a plan partial sectional view of an embodiment of the invention in which the plug of feed material is cut by the flights of a feed screw.

In the embodiment of FIG. 11, which is illustrated in a plan view, material is fed horizontally through a plug screw feeder 224 which has a single flight 226 to a horizontal screw feeder 225 which has four flights 227. The cut material is transferred into an impeller 212 in which the flights 227 optionally are connected to the front edges of the four blades 247. Each blade 247 has a bevelled outer edge 254. The impeller 212 and screw feeder 225 are driven by the same hub 242.

The material is separated into two streams in generally the same manner as in the embodiments of FIGS. 1–7 and 8–9, with discharge taking place on opposite sides of a conduit divider 285.

Figure 12:
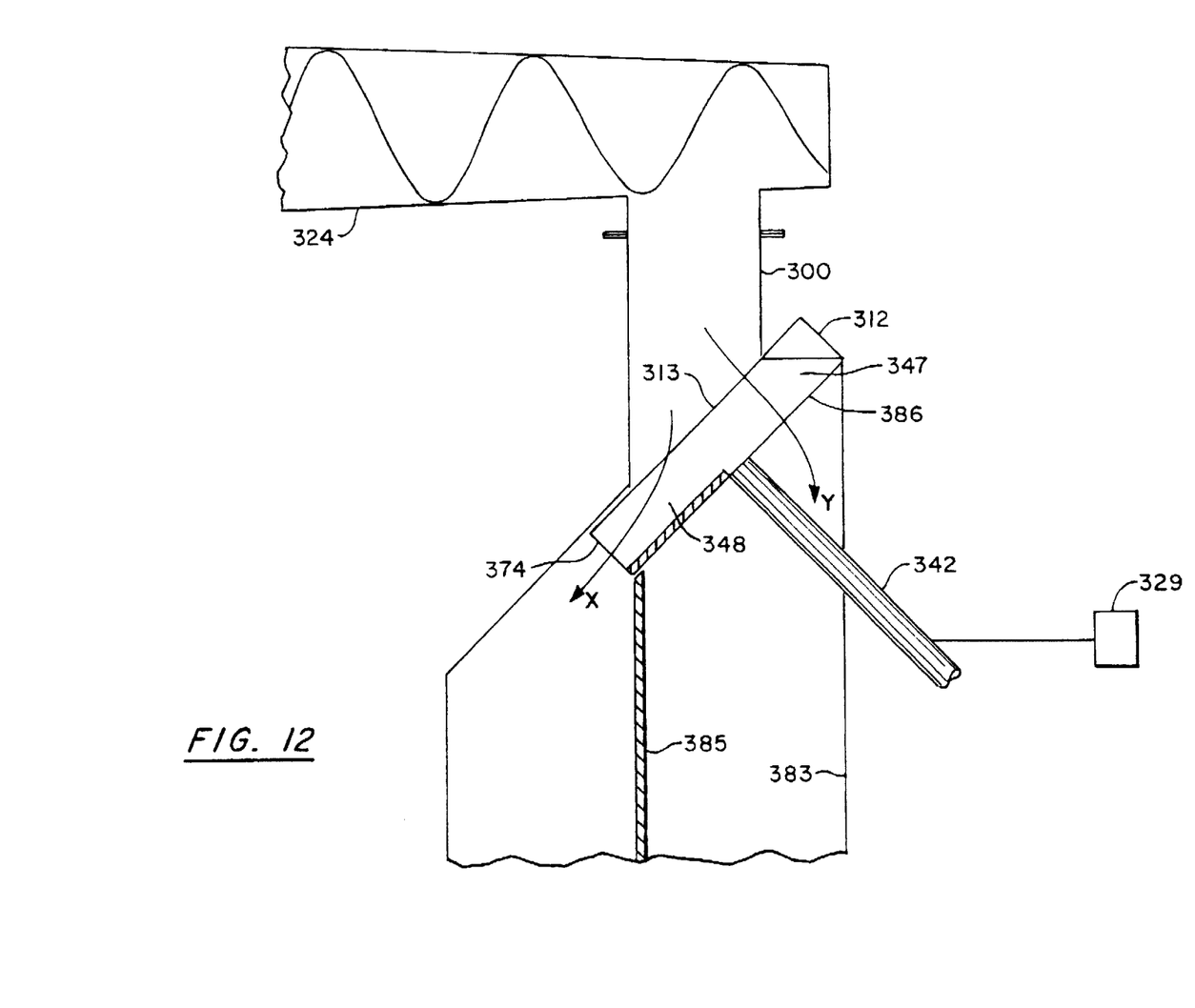
FIG. 12 is a side partial sectional view of an embodiment of the invention in which the impeller is positioned diagonally.

Another embodiment of the invention, which is shown in FIG. 12, involves gravity dropping feed material into a diagonally disposed impeller 312. In this embodiment, feed is fed from a horizontal screw feeder 324 through a stationary conduit 300, which provides for downward vertical feed into the impeller 312. The walls of conduit 300 are fluidly connected to the upstream end 313 of the impeller 312. The impeller has two opposite blades 347 and two opposite blades 348, and is connected to axial hub 342, which is driven by impeller drive means 329. A conduit divider 385 extends downward below the impeller 312 through an outlet conduit 383. The impeller 312 itself has the same construction as impellers 12 and 12' of the first and second embodiments. Thus, half of the feed material exits through the first impeller outlet 374, flowing as shown by arrow X in FIG. 12, and the other half of the material exits through second impeller outlet 386, having a flow path indicated by arrow Y in FIG. 12.

While it is preferable to split a stream into two or more streams having equal volume-flow rates, it is also within the scope of the invention to alter the size of the generally wedge-shaped spaces, change the number of blades, or change the configuration of the guide members 76 and/or wedge-shaped discs 82 such that unequal proportions of the material exit through each of the outlets. For example, if one (but not the other) of the guide members 76 of the embodiment of FIGS. 1–7 were replaced by a wedge-shaped disc 82, three quarters of the volume of the material would exit through the first housing-impeller assembly outlet 74, while one quarter of the material would exit through the second housing-impeller assembly outlet 86.

One of the advantages of the apparatus of the invention is that it is insensitive to downstream pressure fluctuations. The guide members 76 and wedge-shaped discs 82 as well as the blades 47, 48 prevent material from moving from one generally wedge-shaped space 64 or 66 to another after the material has entered the impeller. The only way interchamber movement could occur would be if the material were to move upstream from the impeller inlet after having entered the impeller. Such backflow would not occur even if the downstream pressure of the material entering the impeller is greater than the upstream pressure of the material at the impeller inlet, because the centrifugal force of the spinning blades throws the material to the outer portion of the blades with 10–200 times the force of gravity.

As will be apparent to persons skilled in the art, various modifications and adaptations of the structure above described will become readily apparent without departure from the spirit and scope of the invention, the scope of which is defined in the appended claims.

What is claimed is:

1. An impeller for separating a conveyed stream of material, comprising:

a central, rotatable hub having a length, a plurality of blades extending radially from the hub at generally the same axial location on the hub, each blade having a front edge including a portion which is configured to be fluidly connected to an inlet conduit, a back edge, and an outer edge, the blades and hub defining a first set of generally wedge-shaped spaces and a second set of generally wedge-shaped spaces within the impeller, baffle means formed in or along the first set of generally wedge-shaped spaces, the baffle means having an upstream side and a downstream side and being configured to direct material in the first set of generally wedge-shaped spaces outwardly from the impeller on the upstream side of the baffle means, guide means formed in or along the second set of generally wedge-shaped spaces, the guide means being configured to guide material in the second set of generally wedge-shaped spaces outwardly from the impeller on the downstream side of the baffle means, and an outlet conduit for receiving material which moves outwardly from the impeller, said impeller fluidly connected to said outlet conduit, the outlet conduit having divider means for maintaining separation of material which is directed outwardly from the impeller on the upstream side of the baffle means and material which is guided outwardly from the impeller on the downstream side of the baffle means.

2. An impeller according to claim 1, wherein the baffle means extends between adjacent blades along the back edges of the blades.

3. An impeller according to claim 1, wherein the front edges of the blades include means for cutting the conveyed stream of material.

4. An impeller according to claim 1, wherein the blades are positioned diagonally relative to the length of the hub.

5. An impeller according to claim 3, wherein the blades are positioned diagonally relative to the length of the hub.

6. An impeller according to claim 1, wherein the blades, baffle means and guide means are configured in order that the impeller splits an incoming stream into two streams of equal volume.

7. An impeller according to claim 1, wherein each of the guide means comprises a generally frustoconical segment mounted between adjacent blades.

8. An impeller according to claim 1, wherein the impeller has first and second pairs of blades.

9. An impeller according to claim 8, wherein said outer edge of each said blade is bevelled.

10. An impeller according to claim 9, wherein said outer edge of each said blade in said second pair has an extension extending axially outward from said outer edge.

11. An impeller according to claim 1, wherein the baffle means includes a baffle plate in each wedge-shaped space in the first set of generally wedge-shaped spaces, each baffle plate having a pair of diverging edges connected to adjacent blades.

12. An impeller according to claim 1, wherein each generally wedge-shaped space in the first set is located adjacent to a generally wedge-shaped space in the second set.

13. An impeller according to claim 1, wherein the impeller is fluidly connected at said portion of the front edges of the blades to said inlet conduit which is stationary.

14. An impeller according to claim 13, wherein the inlet conduit is annular and is coaxial with the hub.

15. An impeller according to claim 13, wherein the inlet conduit has an upstream end which is connected to a screw feeder.

16. An apparatus according to claim 1, wherein each of the first and second sets of generally wedge-shaped spaces consists of two generally wedge-shaped spaces.

17. An apparatus according to claim 2, wherein the baffle means extends along the entire length of the back edges of adjacent blades.

18. An apparatus for separating a conveyed stream of material, comprising:

a stationary housing having an annular feed conduit with a central axis and a downstream end, a first wall extending outwardly from a portion of the downstream end, the first wall having an outer perimeter, a second wall connected to the outer perimeter of the first wall and extending in a downstream direction, and a divider wall, an impeller positioned within the housing to form a housing-impeller assembly, the impeller including a central hub which is coaxial with the feed conduit and has a length, a plurality of blades extending radially from the hub, each blade having a front edge, a back edge, and an outer edge, the blades and hub defining a first set of generally wedge-shaped spaces and a second set of generally wedge-shaped spaces within the housing-impeller assembly, baffle means formed in or along the first set of generally wedge-shaped spaces for guiding conveyed material in the first set of generally wedge-shaped spaces outwardly from the housing-impeller assembly upstream from the baffle means through a first housing-impeller assembly outlet which is defined by the annular feed conduit, the baffle means, the blades and the hub, and guide means formed in or along the second set of generally wedge-shaped spaces for guiding material in the second set of generally wedge-shaped spaces outwardly from the housing-impeller assembly downstream from the baffle means through a second housing-impeller assembly outlet which is defined by the blades, the hub and the guide means, said divider wall maintaining separation of material directed outwardly from the impeller on the upstream side of the baffle means and material which is guided outwardly from the impeller on the downstream side of the baffle means.

19. An apparatus according to claim 18, wherein the front edges of the blades include means for cutting the conveyed stream of material.

20. A method of separating a conveyed stream of material, comprising feeding the material from an inlet conduit into an impeller which includes:

a central, rotatable hub having a length, a plurality of blades extending radially from the hub at generally the same axial location on the hub, each blade having a front edge including a portion which is configured to abut the inlet conduit, a back edge, and an outer edge, the blades and the hub defining a first set of generally wedge-shaped spaces and a second set of generally wedge-shaped spaces within the impeller, baffle means formed in or along the first set of generally wedge-shaped spaces, the baffle means having an upstream side and a downstream side and being configured to direct material in the first set of generally wedge-shaped spaces outwardly from the impeller on the upstream side of the baffle means, guide means formed in or along the second set of generally wedge-shaped spaces, the guide means being configured to guide material in the second set of generally wedge-shaped spaces outwardly from the impeller on the downstream side of the baffle means, and an outlet conduit, said impeller fluidly connected to said outlet conduit, said outlet conduit for receiving material which moves outwardly from the impeller, the outlet conduit having divider means for maintaining separation of material which is directed outwardly from the impeller on the upstream side of the baffle means and material which is guided outwardly from the impeller on the downstream side of the baffle means.

21. A method according to claim 20, wherein the impeller provides for the splitting of a stream into two streams of equal volume.

22. A method according to claim 20, wherein the step of feeding comprises feeding a plug of material into the impeller.

* * * * *